March 15, 1966  B. O'BRIEN, JR  3,240,142
CONTACT PRINTER
Original Filed Dec. 1, 1961
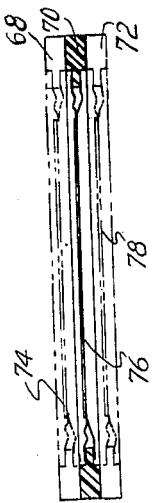
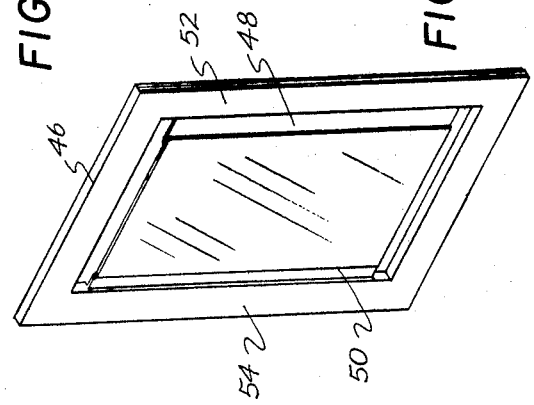
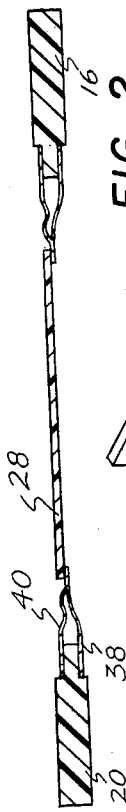
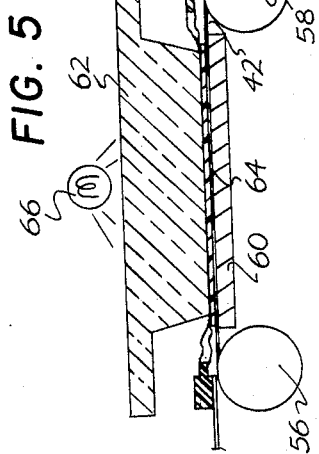
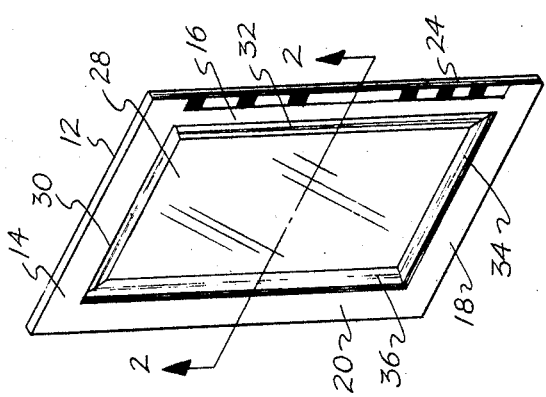
BRIAN O'BRIEN JR.
INVENTOR.
BY Stanley Belsky
ATTORNEY

3,240,142
CONTACT PRINTER
Brian O'Brien, Jr., Fabyan, Conn., assignor to Itek Corporation, Lexington, Mass., a corporation of Delaware
Continuation of application Ser. No. 156,276, Dec. 1, 1961. This application June 17, 1964, Ser. No. 375,909
1 Claim. (Cl. 95—75)

This application is a continuation of the copending application Serial No. 156,276, filed December 1, 1961.

This invention is directed to a carrier for film records and the like. In particular, the invention relates to a record carrier wherein the record sheet is resiliently mounted in an opening in the record carrier.

While the invention is subject to a wide range of application, it is especially suited for use in a data processing system for records which are to be filed, indexed, machine classified, sorted as to subject matter, projected, viewed, copied or otherwise employed. The invention is particularly adapted for use in a data processing system wherein the apparatus has photograhic contact printing capabilities. It is in the latter adaptation that the invention will be described.

Data processing systems wherein the data is presented on an insert in a carrier which can be selected automatically from among other carriers of a like nature are known in the art. Such systems often include a copying device whereby the selected insert can be copied and the carrier therefor restored to its original place with the other carriers. Heretofore, copying by contact printing has required manual handling procedures, that is, the frame had to be manually removed from the data processing apparatus and the insert manually prepared and inserted into the contact printer. After printing, the insert had to be manually removed from the printer, replaced into the record carrier and then returned to the data processing apparatus.

The prior art discloses a number of devices for mounting a record sheet. For example, Patent Number 2,968,884, to Frank J. Anastasio et al., discloses a frame for holding a section of film for use with a projection apparatus. The film mount or carrier comprises a pair of thin frame members between which is clamped the film sheet. Each frame member has a central aperture and a surrounding recessed area. A boss and groove portion are provided on each frame member and are continuous around the marginal portions of each frame thereby imparting added rigidity to the frame. Unless the insert is removed from the frame, uniform contact with the entire surface of the print medium cannot be accomplished because of the necessity for accommodating to the contours of the frame and the recess. The result is loss of resolution and data.

A further example is Patent Number 2,633,654 to R. C. Roetger which discloses a card having an aperture therein of a predetermined size and shape and an insert having a thickness less than the thickness of the card. The insert is positioned within the aperture centrally between opposite planes of the card. The insert is substantially the same size and shape as the aperture so as to closely engage the surrounding aperture wall. An adhesive substance holds the insert to the card. The adhesive substance contacts the surrounding wall of the aperture and the insert only at the point between the insert and the card. While the arrangement which Roetger discloses reduces resolution loss, it has the disadvantage that the insert cannot be removed with destroying the card or at the very least, without destroying the adhesive. This, of course, makes remounting tedious and time consuming. A further example is Patent Number 2,512,106 to J. M. Langan which discloses a record card having an aperture for mounting film. A portion of the card is compressed to form a permanent impression in one side of the card around the aperture. A thin sheet coated with pressure sensitive adhesive material is secured to the edges of the card where the depression is located. The sheet has an aperture and the film is mounted within the aperture by means of this adhesive material. A problem with this is arrangement is that the surface of the film becomes damaged if it comes in contact with other cards as when the cards are arranged in a stack. In this same patent, another embodiment is disclosed wherein a transparent material is secured over the aperture at one face of the card. The edges of the sheet overlap the card around the aperture and are compressed with the sheet embedded in the surface of the card a distance equal to the thickness of the sheet. The outer surface of the sheet lies in the plane of the adjacent surface of the card. The card is adapted for the insertion of the film in the aperture against the sheet. While this embodiment overcomes the problem of damage to the film, it now becomes necessary to remove either the film or the transparent sheet in order to permit contact printing.

Further, the prior art as exemplified by the above patents is objectionable because there are no provisions for overcoming the natural tendency of the film to bulge, warp, and curl. Also, the mountings of the prior art are not adapted to accommodate shrinkage or expansion of the film. It is these characteristics which increase the damage to the film surface by increasing the probability of the film-to-film contact when the mounts are stacked.

The representative prior art contemplates the use of small size inserts, for example, eight and sixteen millimeter microfilm. However, data processing systems now are capable of handling record carriers with associated inserts made from 70 millimeter and larger film strips. The problems associated with the smaller sizes become more pronounced when larger size film inserts are employed.

The problem of adapting a film record carrier for use in an automated date processing system with a contact printing capability is solved according to the present invention by the provision of a resilient mounting for the record sheet. This mounting supports the record sheet in a plane normally intermediate the surface planes of the frame but permits movement of the insert out of this plane.

An object of this invention is to provide an improved record carrier for use in an automated data processing system.

Another object of this invention is to provide a record carrier for use in a photographic film contact printer.

A further object of this invention is to provide a record carrier wherein the insert is extendable from the plane of the frame.

A further object of this invention is to provide a record carrier which protects the film from surface wear and damage when it is placed in a stack of other film carriers.

A further object of this invention is to provide a carrier for film from which contact prints can be readily made without distorting the film shape.

A further object of this invention is to provide a record carrier which reduces film warp and curl.

A further object of this invention is to provide a record carrier which is economical in manufacture, light weight, and easy to use.

For a better understanding of the present invention together with other and further examples thereof, reference is made to the following description taken in connection with the accompanying drawing.

In the drawing:

FIGURE 1 is a perspective view illustrating a preferred embodiment of the present invention with four webs;

FIGURE 2 is a cross sectional view taken along lines 2—2 in FIGURE 1;

FIGURE 3 is a perspective view of a record carrier with two webs;

FIGURE 4 is a cross sectional view of a stack of record carriers;

FIGURE 5 is a photographic film contact printer for use with the record carrier of FIGURE 1 or FIGURE 3.

With particular reference to FIGURES 1 and 2, it will be observed that the numeral 12 designates a frame which is essentially rectangular, and can be manufactured of cardboard, plastic or metal, depending on the character of the data processing system with which the frame is to be used. The numerals 14, 16, 18, and 20 respectively designate the arms of the frame which are joined at their extremities so as to define an opening.

The outer edge surfaces of the frame are encoded in a manner determined by the type of sensing mechanism used in the data processing system. For example, one edge can be provided with a magnetic strip 24 which is encoded to provide a magnetic representation of the accession number, the information on the data bearing medium, or other information capable of being encoded in binary magnetic form by means of magnetized spots.

The record sheet may be a film or microfilm reproduction of data or information, as, for example, pages of a book, the records of a business, drawings or blueprints. Where the record sheet is a film, the data or information is recorded on the film by any suitable photographic process. After the film is processed to fix the photographic image, the film is mounted within the opening by resilient means.

In the preferred embodiment (FIGURE 1), the resilient means for coupling the film 28 to the frame 12 comprise four webs, 30, 32, 34, and 36 respectively extending between the arms 14, 16, 18, and 20 respectively and the respective edges of the film 28. Each web (FIGURE 2) is formed with two narrow strips of metal foil 38 and 40 that are longitudinally corrugated, or in other words have plicaform surface contours. The strips 38 and 40 are preferably manufactured from stainless steel, having a thickness, which by way of example may be in the neighborhood of .002 inch. Their width is determined primarily by the distance the plane of the film 28 must be moved so that the film 28 is freely accessible to the contact printer film 42 (FIGURE 5). Strips 38 and 40 are disposed one above the other and each has one of its edges joined to the other in a manner to provide a narrow flat surface for coupling to the margin of the bottom of the film 28. The other edges are joined to opposite sides of the frame along its inner peripheral edges which are recessed. The depth of each recess is substantially greater than the thickness of the foil, so that the foil surface does not extend beyond the plane of either the top or bottom surface of the frame 12.

With reference to FIGURE 3, an alternative means for coupling the film to the frame 46 comprises two webs 48 and 50 extending between the arms 52 and 54 and the respective edges of the film. Each web is formed as described hereinbefore for four web mounting.

The film 28 is prepared for mounting at a temperature and humidity above that as will be encountered in the environment in which the film 28 will be employed. At the elevated temperature and humidity, the film 28 will have expanded and while in this condition the bottom edges of the film 28 is secured to the narrow flat surface of the web by an appropriate adhesive for securing film to metal. As operational conditions are achieved, the film 28 shrinks and is held taut by the webs, which overcome the natural tendency of the film to curl and warp.

An alternative method for mounting the film 28 is to extend the webs by applying a pressure to the webs and securing the bottom edges of the film 28 to the narrow flat surface of the web. The pressure applied to the strips is removed thereby applying tension to the film as the webs return to their normal configuration.

A method for utilizing the record carrier in a photographic film contact printer will be described with reference to FIGURE 5. After selection and isolation of the desired record carrier, it is contemplated that the carrier will be automatically transported with the film mounted therein to a position in parallel spaced relation to a contact printing film 42. The contact printing film 42 extends from a supply roll 56 to a take-up roll 58 and in between is supported by a platen 60. A transparent platen 62 is positioned above the film 64 and a light source 66 is in turn positioned above the transparent platen 62. Pressure means, such as a pneumatic system forces the transparent platen 62 against the bottom of the film 64. The pressure extends the film 64 a distance at least as great as the distance corresponding to the spacing between a surface plane of the frame 68 and the plane of the film 64 when in its normal position, depending upon the requirements of the particular contact printing device. The transparent platen 62 forces the film 64 against the contact printing film 42 to insure complete surface-to-surface contact for complete data transfer between the surfaces of the film 64 and the contact printing film 42 when the light source 66 is activated.

In FIGURE 4 it is observed that when a plurality of film frames 68, 70, and 72, for example are stacked, the individual films 74, 76, and 78 respectively assume a plane intermediate that of their frame. The films do not touch one another and thus preventing film to film rubbing and scratching to damage the data on the film.

While the present invention is illustrated and described in connection with a record sheet carrier wherein the resilient web is made from metal foil, it is to be understood that other means and materials for making a resilient web are available. For example, the resilient web may be constructed of plastic having a corrugation or the frame and web may be integrated into one plastic piece. Since various such changes may be made in the design and arrangement of the parts of the illustrated embodiment without departing from the spirit and scope of the invention it will be apparent that the present invention is not limited to the details of the particular embodiment illustrated and described but only by the scope of the appended claim.

What is claimed is:

In a data processing system for photographically copying a flexible light transmissive data record sheet, said system including a support platen for supporting a contact printing medium, the improvement comprising:

a transparent platen in parallel spaced relation with said support platen;

means for disposing said printing medium on said support platen parallel to said transparent platen;

a record card having an aperture therein, said record card including a flexible light transmissive data record sheet, and resilient means for coupling the peripheral edges of said record sheet to the peripheral walls of said aperture in a plane intermediate the surface planes of said record card, said resilient means being sufficiently extensible to permit said record sheet to be moved in a direction normal to the plane of said record card to dispose the plane of said record sheet in a surface plane of said record card and said resilient means being maintained between the surface planes of said record card when not in the extended position;

means for supporting said record sheet between said printing medium and transparent platen;

means for driving said transparent platen against said record sheet to move said record sheet in a direction normal to the plane of said record card whereby the plane of said record sheet is disposed in face to face contact with said copying medium; and means for exposing said printing medium to light transmitted through said transparent platen and said record sheet, whereby data on the record sheet is photographically copied.

No references cited.

EVON C. BLUNK, *Primary Examiner.*